United States Patent [19]

Moriello

[11] Patent Number: 5,037,051
[45] Date of Patent: Aug. 6, 1991

[54] NOVELTY HANGER MOUNTABLE ON REAR VIEW MIRROR

[76] Inventor: Domenico Moriello, 40 Versalles Ct., Trenton, N.J. 08619

[21] Appl. No.: 556,286

[22] Filed: Jul. 23, 1990

[51] Int. Cl.$^5$ ............................................. A47B 96/06
[52] U.S. Cl. ..................................... 248/215; 211/113; 248/304
[58] Field of Search ............... 248/215, 227, 294, 301, 248/303, 304, 305, 306, 309.1, 339, 340, 208, 211, 213, 214; 211/113, 119, 42

[56] References Cited

U.S. PATENT DOCUMENTS

| | | | |
|---|---|---|---|
| D. 305,299 | 1/1990 | Freeman | 248/214 X |
| 373,472 | 11/1887 | Moser | 248/214 |
| 3,091,344 | 5/1963 | Bullock | 211/113 |
| 3,160,438 | 12/1964 | Davis | 211/42 X |
| 3,260,489 | 7/1966 | Hentzl | 248/215 |
| 3,536,287 | 10/1970 | Kramer | 248/215 X |
| 3,578,282 | 5/1971 | Olsen | 248/214 |
| 4,193,504 | 3/1980 | Berkowitz | 211/119 |
| 4,203,175 | 5/1980 | Heine | 248/215 X |

Primary Examiner—Ramon O. Ramirez
Attorney, Agent, or Firm—William L. Muckelroy

[57] ABSTRACT

An article support mountable on a rear view mirror located in the interior of an automobile which provides means for hanging and displaying a plurality of novelties usually hung from the neck of the rear view mirror.

5 Claims, 2 Drawing Sheets

NOVELTY HANGER MOUNTABLE ON REAR VIEW MIRROR

SUMMARY OF THE INVENTION

The present invention discloses a hanger for a plurality of novelties wherein the hanger is adapted to attach to a rearview mirror of an automobile. The hanger includes a pair of spaced-apart inverted hooks adapted to hang over the top of the rear view mirror. The inverted hooks extend from the top edge of the front of the mirror down the rear of the mirror where each connects to a horizontal bar having a plurality of smaller hooks extending downward therefrom. The smaller downward extending hooks are each adapted to receive and hang a novelty customarily hung from the neck of the automobile rear view mirror.

BACKGROUND OF THE INVENTION

1. Field of the Invention

This invention relates to hook and bracketing means for demountably hanging a plurality of novelty items in spaced relationship to each other from the rear view mirror located in the interior of an automobile.

2. Description of the Prior Art

Young automobile owners throughout the country have long exhibited a custom of hanging various novelties from a neck supporting the rear view mirror of an automobile. It is not unusual to see several novelties including a high school graduation tassel, miniature dolls, puppets, rosary beads and articles of underclothing all clumped together and hanging from the singular neck supporting the rear view mirror. Usually the owner of the automobile takes pride in the display of these personal articles and novelties but hangs them all together in a cluttered fashion from the single supporting neck of the rear view mirror because of the absence within the interior especially with newer model automobiles of protruding knobs or other devices unto which to hang and display these items. Other drivers have even resorted to using the neck of the rear view mirror to hang their sunglasses as well. Various novelty companies have sprung up and are presently in existence solely for the manufacture of soft cushiony objects such as large dice and foam rubber balls connected by a piece of rope, for example.

Since at least the 1960's various means using magnets for general attachment have been available. In particular, U.S. Pat. No. 2,965,235 was issued to Daline for a perforated display panel with magnetic attachment means. This invention provided a display board including a perforated panel wherein attachment plug members are mounted in selected holes and are magnetically held therein. In 1961 U.S. Pat. No. 2,977,082 was issued to A. L. Harris for a magnetic support which employs ring magnets to attach a variety of objects or holders or brackets to metallic surfaces. Later, in 1964 U.S. Pat. No. 3,118,207 entitled "Separable Drapery and Curtain Hanger" was issued to Breslow. This invention provided a hanger construction readily attachable to a supporting object and having a separable connection so that after mounting, the hanger itself could be removed from the drapery or curtain and be replaced as desired. Also, in 1964 U.S. Pat. No. 3,126,190 was issued to R. M. Miller for a "Magnetic License Bracket". The invention was a combination hook and magnetic bracket for temporarily attaching license plates to automobiles.

In 1966, U.S. Pat. No. 3,239,179 was issued to J. M. Margulis for a "Wall and Ceiling Hanger". The invention was an improved wall and ceiling hanger rotably mounted for correct positioning when applied to a wall or ceiling and adapted to be fastened to a wall or ceiling by any suitable means, for example, magnetic, adhesive or screw fastening. In 1967 U.S. Pat. No. 3,329,277 was issued to O. A. Gaudino for a "Coin, Key and Paper Holder Mountable on Dash Board". The invention provided a mechanical apparatus, mountable on a dash board on a magnet and readily removable, in which could be inserted one's pocket or purse change and at the same time provide a display means for a driver to observe, have available coins for parking and vending machines and the like.

In the next decade, in particular, in 1973 U.S. Pat. No. 3,756,550 was issued to Kollitz for a "Spring Clip Device". This invention provides a spring loaded clip device, including a main body to which there is attached a second body, and having disposed there between a spring means. The second body is adapted with a leaf spring which is attached to the upper side of the second body and which forceably engages the main body on the under side thereof.

The novel invention addresses the problem of how to provide a practical means for displaying in spaced relationship to one another a variety of light weight novelty items usually and customarily hung from the neck of the rear view mirror of an automobile. The novel invention especially recognizes a need in the marketplace among young couples who for example own one car and desire to prominently display, for example, their respective graduation tassels, in combination with a variety of other miniature items spaced apart from one another such that each is distinctly visible and distinguishable from the other.

The novel invention has addressed the above need as will be readily understood in the description of the present invention.

SUMMARY OF THE INVENTION

The present invention discloses a hanger bar preferably made of plastic for supporting and which is demountably detachable to a rear view mirror located in the interior of an automobile. The hanger is made of a horizontal bar member having attached thereto and equally spaced therealong a number of hooks for hanging a variety of novelties. The horizontal bar is suspended from the rear view mirror and is attached to the rear view mirror at at least two points. One embodiment of the invention uses a pair of vertical members near or at each end of the horizontal bar which are attached to the rear of a rear view mirror made of a metallic material to which magnets located at the end of each vertical member are attached. Another embodiment of the novel invention uses two inverted hooks, one located on either side of the supporting neck of the rear view mirror for hanging the horizontal bar member.

OBJECTS AND ADVANTAGES OF THE INVENTION

The present invention has for an important object the divarication of as many as six different novelties from around the neck of a rear view mirror of an automobile.

It is another object of the present novel invention to provide a hanger whereby up to as many as six different novelties may be hung, equally spaced from below the rear view mirror.

It is another object of the present invention to provide a hanger means for novelties to be hung from the rear view mirror whereby the hanger is attached to the rear view mirror by means of magnets.

It is yet another object of the invention to provide a hanger for hanging novelty items from the rear view mirror of an automobile which is attachable to the rear view by a pair of mechanical inverted hooks.

It is a further object of the invention to provide a device of this character that is relatively inexpensive to manufacture and may in fact be made of one piece of molded plastic in a variety of colors.

It is still a further object of the invention to provide a device of this character that is simple and rugged in construction.

Yet another object of the invention is to provide one embodiment that has no moving parts.

Other characteristics, advantages and objects of this invention can be more readily appreciated from the following description and appended claims. When taken in conjunction with the accompanying drawings, this description forms a part of the specification wherein like references and characters designate corresponding parts in the several views.

DESCRIPTION OF THE DRAWINGS

Referring more particularly to the accompanying drawings, which are for illustrative purposes only, the novel invention is accurately displayed in the following, to wit.

DESCRIPTION OF THE PREFERRED EMBODIMENT

Figure 1:
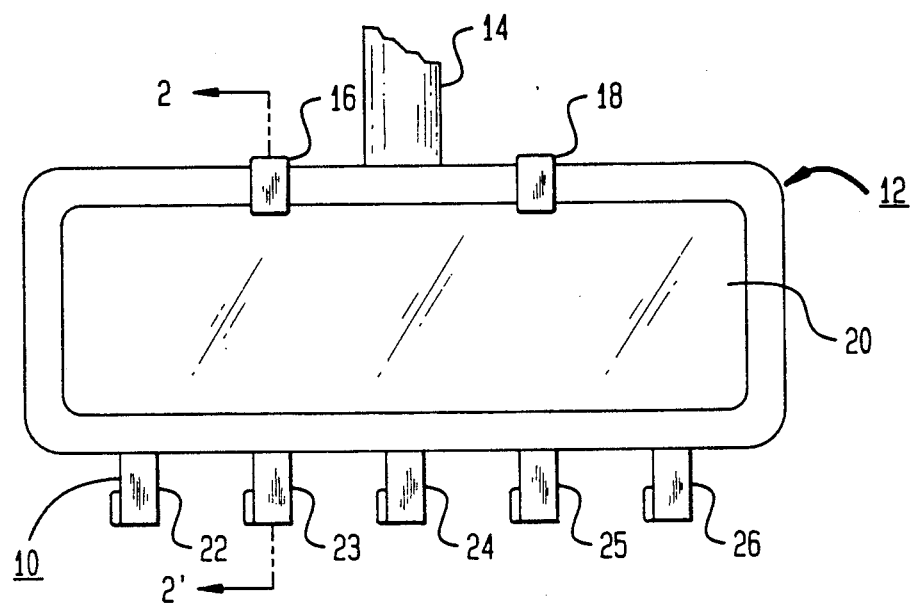
FIG. 1 is a front elevational view of one embodiment of the novel invention attached to a rear view mirror of an automobile.

Referring to the drawings and particularly to FIGS. 1 through 4, there is shown a novel hanger, the hanger being generally indicated at 10. Due to the fact that various configurations for the hanger may be employed using the disclosure of the present invention, the above mentioned figures are selected to illustrate a preferred embodiment of a hanger 10 comprising a multiple of hooks, generally used individually to hang items therefrom. Therefore, this hanger 10 is specially adapted to hang from a rear view mirror assembly 12 attached to an automobile (not shown) by a neck assembly 14. The hanger 10 is adapted to be mountably attached to the assembly 12 by a pair of inverted hooks 16 and 18. The mirror assembly 12 comprises a mirror 20.

The inverted hooks 16 and 18 are arranged such that they attach to and connect over the top of assembly 12 without blocking the view of the mirror 20. The hooks 16 and 18 are integrally connected to a plurality of hooks 22, 23, 24, 25 and 26. These hooks 22, 23, 24, 25, and 26 extend downward and in the vicinity of a bottom of the assembly 12. Each of the hooks 16 and 18 is juxtaposed against a top of the assembly 12. The hooks 16 and 18 are separated by the neck assembly 14 attaching the rear view mirror assembly 12 to the interior of the automobile. A combination of the inverted hooks 16 and 18 with the plurality of downward projecting hooks 22, 23, 24, 25 and 26, for example wherein the hooks 16 and 18 are specifically adapted to attach to the rear view mirror assembly 12 provides a unique combination of elements. These elements provide a means for hanging in spaced relationship to one another a plurality of novelty items in the interior of an automobile, heretofore unobtainable. Unique to the design of hanger is the arrangement whereby the hooks 16 and 18 extend rearward in the direction in which the mirror 20 reflects and the plurality of hooks 22, 23, 24, 25 and 26 extend in the opposite direction such that the center of gravity of hanger is located in between the plurality of hooks for hanging the various novelty and the pair of hooks for attachment of the hanger 10 to the mirror assembly 12. This arrangement provides inherent structure stability.

Figure 2:
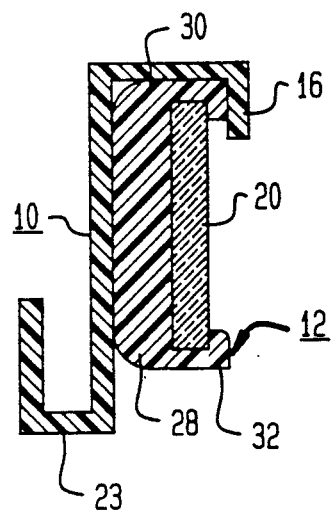
FIG. 2 is a cross-sectional view of the novel invention taken along line 2—2' of FIG. 1.

Referring now to FIG. 2 the hanger 10 is shown in cross section along its width, specifically along the line 2—2' shown in FIG. 1. The hanger 10 is shown made of a plastic material integrally molded to form the hook 16 and the hook 23, for example. Further shown in FIG. 2 is a cross-section of a rear view mirror assembly 12 comprised of a plastic housing 28 partially enclosing the mirror 20. As shown in cross section FIG. 2, the hook 16 is inverted and resembles an upside down L-shaped member. The hook 23 resembles a backwards L-shaped member and is similar in all respects except position to the other previously mentioned hooks 22, 24, 25, and 26. The inverted hook 16 is shown adapted to fit over the top of the assembly 12. The assembly 12 has a top 30 and a bottom 32. The hook 16 is shown arranged juxtaposed to the top 30 of the rear view mirror assembly 12.

Figure 3:
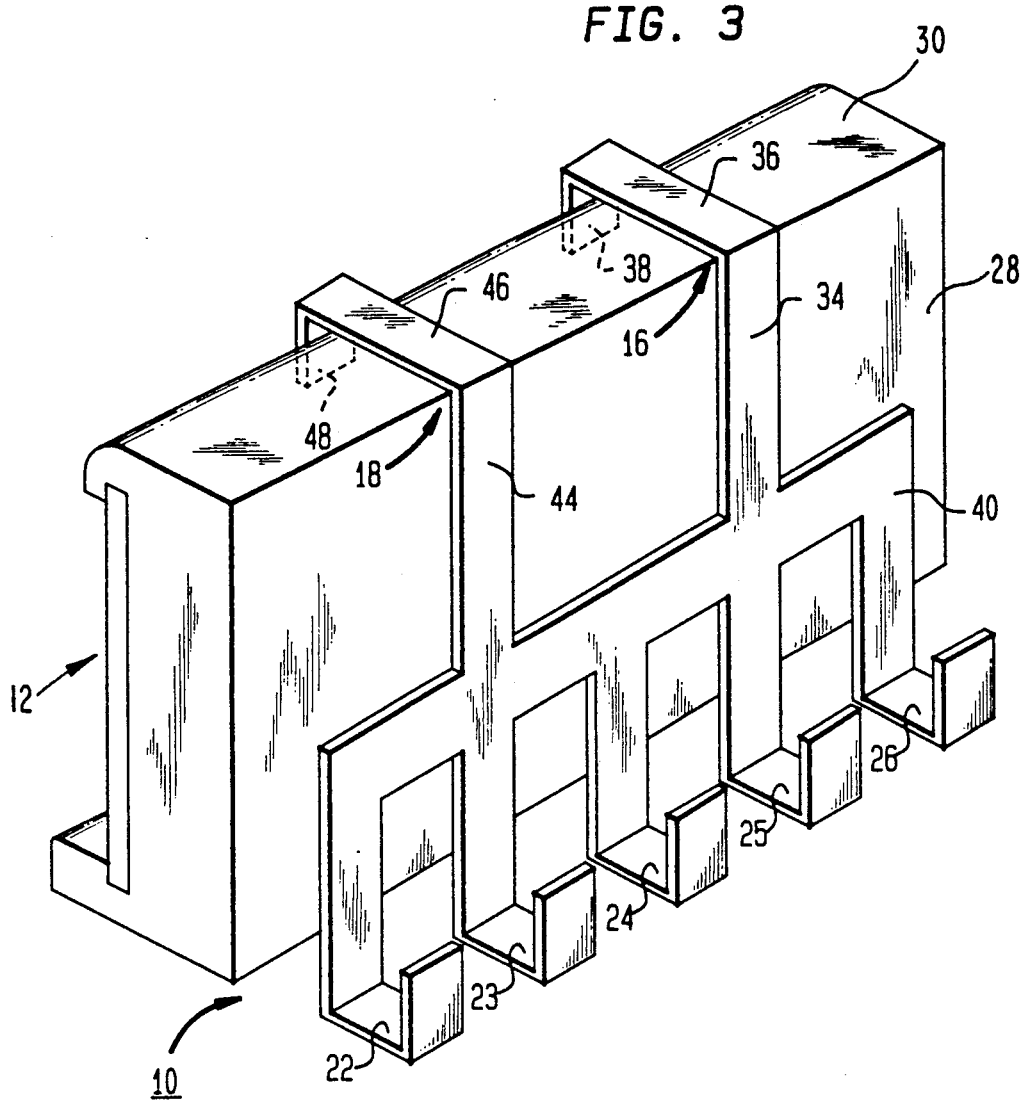
FIG. 3 is a perspective view of the novel hanger.

Referring now to FIG. 3 there is shown the hanger 10 in perspective. The hook 16 is comprised of a vertical member 34 attached to a transversed member 36 which in turn is attached to a vertical down projecting tab 38. The tab 38 is adapted to engage the body 28 of the rear view mirror assembly 12. The transversed member 36 is juxtaposed adjacent the top 30 of the body 28 of the rear view mirror assembly 12. The vertical member 34 which is longer than the member 38 extends downward and connects to a horizontal bar 40. Likewise, the hook 18 is comprised of a vertical member 44 which is connected to a horizontal member 46. The horizontal member 46 interconnects the vertical member 44 to a vertical tab 48 which is adapted to engage the housing 28 comprising the rear view mirror assembly 12. Horizontal member 46 is juxtaposed adjacent the top 30 of the assembly 12 on the opposite side of the neck assembly 14 (shown in FIG. 1). The vertical member 44 is longer than the vertical tab 48 and interconnects the transverse or horizontal interconnecting member 46 to the horizontal bar 40. As further shown in FIG. 3 the horizontal bar 40 has attached thereto in the equally spaced relationship a plurality of downward projecting hooks 22, 23, 24, 25, and 26.

Figure 4:
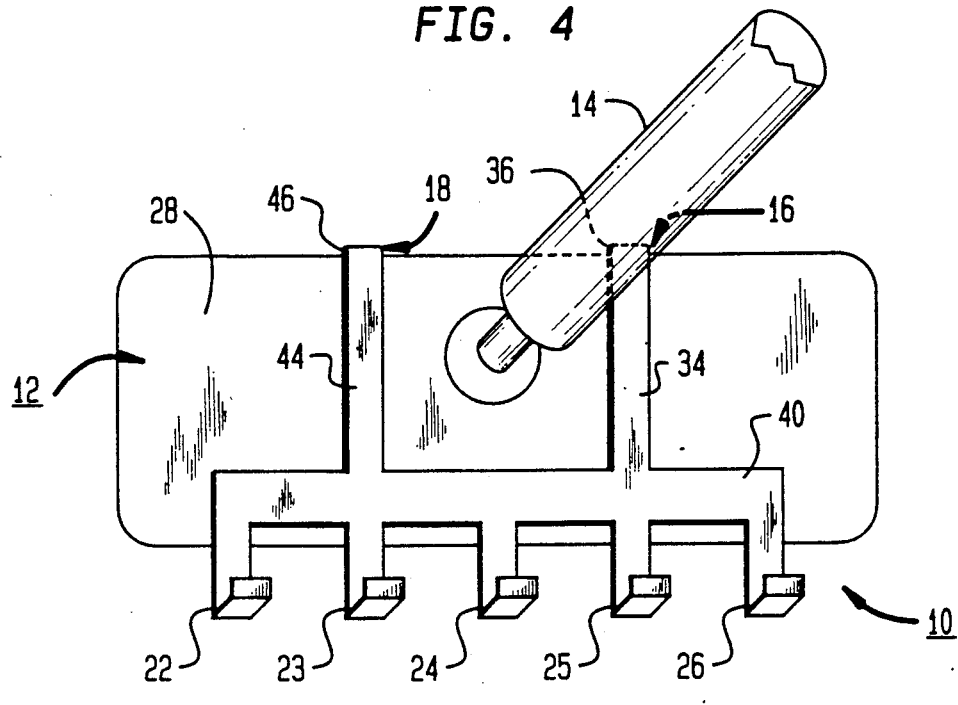
FIG. 4 is a rear perspective view of the novel hanger attached to a rear view mirror of an automobile.

Referring now to FIG. 4, there is shown the hanger 10 demountably attached to the rear view mirror assembly 12 by means of the pair of hooks 16 and 18. The hooks 16 and 18 provide a hanging means for suspending the horizontal bar 40 from the rear view mirror assembly 12. The horizontal bar 40 is adapted to interconnect in spaced relationship a plurality of attachment means for example, the hooks 22, 23, 24, 25, and 26. The horizontal bar 40 interconnects in an equally spaced relationship the hooks 22, 23, 24, 25, and 26 which together form a plurality of attachment means each adapted to hang a novelty therefrom. The hooks 16 and 18 when inverted as shown provide the above-referenced hanging means for suspending the plurality of hooks 22, 23, 24, 25, and 26 from the rear view mirror assembly 12. Each of the hooks 16 and 18 comprise a vertical member connected to the horizontal bar 40. Specifically, the hook 16 is comprised of a first vertical member, the vertical member 34, for example. The inverted hook 18 is comprised of a second vertical member, for example the vertical member 44.

The hanging means comprised of the inverted hook 16 and the inverted hook 18 makes up a fastener assembly for fastening the hanger 10 to the rear view mirror assembly 12. The hook 16 is a first fastener for fastening the hanger 10 to the rear view mirror assembly 12. The inverted hook 18 is a second fastener also for fastening the hanger 10 to the rear view mirror assembly 12.

What is claimed is:

1. A hanger for supporting and demountably attaching a variety of novelties to an automobile rear view mirror having a top and a bottom and a neck assembly connected thereto comprising in combination
   (a) A plurality of attachment means, located below the bottom of said rear view mirror each said attachment means being adapted to hang a novelty therefrom;
   (b) A horizontal bar adapted to interconnect said plurality of attachment means;
   (c) A hanging means for suspending said horizontal bar from said rear view mirror sand hanging means being connected to said horizontal bar, said horizontal bar interconnecting each said attachment means;
   (d) A first vertical member connected to a first location on said horizontal bar and a second vertical member connected to a second location on said horizontal bar, said first and second vertical members being connected to said hanging means, said hanging means comprising at least a first fastener and a second fastener, said first fastener being connected to said first vertical member and to the top of said rear view mirror proximate to one side of said neck assembly and said second fastener being connected to said second vertical member and to the top of said rear view mirror proximate to an opposite side of said neck assembly.

2. The hanger according to claim 1 wherein said first vertical member has a first inverted hook, said member being adapted to fit on a rear-view mirror and wherein said second vertical member has a second inverted hook, said second member being adapted to fit on said rear-view mirror, said rear view mirror having a back side, said first and second vertical members being adapted to fit adjacent said back side whereby view from the rear view is unobstructed.

3. The hanger according to claim 2 wherein said first and second vertical members and said horizontal member are an integral unit.

4. The hanger according to claim 2 wherein said hanging means is comprised of the combination of said first inverted hook and said second inverted hook.

5. A hanger for supporting and demountably attaching a variety of novelties to an automobile interior having a rear view mirror, said mirror having a top and a bottom, said mirror being attached to said interior via a neck assembly, said hanger comprising in combination a pair of inverted hooks arranged such that they attach to and connect over the top of said rear view mirror without blocking any view from the rear view mirror, said pair of inverted hooks being integrally connected to a plurality of other hooks which extend downward and below the bottom of said rear view mirror, each of the inverted hooks being juxtaposed against the top of said rear view mirror, the inverted hooks being separated by the neck assembly of said rear view mirror, said plurality of other hooks being arranged in a spaced relationship to one another, said inverted hooks extending rearward in the direction in which said rear view mirror reflects, the plurality of other hooks extending forward in a direction opposite to said inverted hooks such that the hanger has a center of gravity located in between the plurality of other hooks and the pair of inverted hooks, each of the inverted hooks resembling an upside down L-shaped member and each of the downward projecting hooks resembling a backwards L-shaped member.

* * * * *